(12) United States Patent
Chubachi et al.

(10) Patent No.: US 7,139,123 B2
(45) Date of Patent: Nov. 21, 2006

(54) SCREEN

(75) Inventors: Hideya Chubachi, Tokyo (JP); Hiroshi Hayashi, Miyagi (JP); Osamu Ikeda, Saitama (JP)

(73) Assignee: Sony Corporation (JP)

( * ) Notice: Subject to any disclaimer, the term of this patent is extended or adjusted under 35 U.S.C. 154(b) by 210 days.

(21) Appl. No.: 10/874,243

(22) Filed: Jun. 24, 2004

(65) Prior Publication Data

US 2005/0007663 A1 Jan. 13, 2005

(30) Foreign Application Priority Data

Jul. 9, 2003 (JP) .......................... P2003-272272

(51) Int. Cl.
*G03B 21/56* (2006.01)

(52) U.S. Cl. .................................... 359/449

(58) Field of Classification Search ................ 359/449, 359/459, 457, 742–743
See application file for complete search history.

(56) References Cited

U.S. PATENT DOCUMENTS

| | | | | |
|---|---|---|---|---|
| 3,893,748 A | * | 7/1975 | De Palma et al. ......... | 359/455 |
| 4,108,540 A | * | 8/1978 | Anderson et al. .......... | 359/742 |
| 5,096,278 A | * | 3/1992 | Yoshioka et al. .......... | 359/459 |
| 5,161,880 A | * | 11/1992 | Azuma ...................... | 362/223 |
| 5,402,263 A | * | 3/1995 | Kita et al. ................. | 359/451 |
| 6,023,369 A | * | 2/2000 | Goto ......................... | 359/443 |
| 6,894,835 B1 | * | 5/2005 | Ohsako et al. ............. | 359/449 |

FOREIGN PATENT DOCUMENTS

| JP | 10-142699 | 5/1998 |
|---|---|---|
| JP | 2000-162710 | 6/2000 |

* cited by examiner

*Primary Examiner*—Christopher Mahoney
(74) *Attorney, Agent, or Firm*—Rader, Fishman & Grauer PLLC; Ronald P. Kananen

(57) ABSTRACT

A screen with an improved luminance uniformity is provided. A diffusion film that is disposed at the front surface of the screen is attached to a Fresnel lens with an adhesive. The Fresnel lens is attached to a reflective layer that is deposited on a base film with an adhesive that has a refractive index lower than that of the Fresnel lens and as low as possible.

24 Claims, 14 Drawing Sheets

SCREEN

BACKGROUND OF THE INVENTION

1. Field of the Invention

The present invention relates to a screen with an improved luminance uniformity.

2. Description of the Related Art

In recent years, overhead projectors and front projectors have widely been used for presentations in meetings and conferences. Liquid crystal video projectors and moving-image projectors are also becoming widespread for household use. These projectors project light on a screen by modulating light from a light source via, for example, a transmissive liquid crystal panel to form a light image and emitting the light image through an optical system, such as lenses.

For example, a projector that forms color images on a screen includes an illuminating optical system that separates light from a light source into red (R), green (G), and blue (B) and then converges them on a predetermined optical path; a liquid crystal panel that modulates each red, green, and blue flux separated by the illuminating optical system (light valve); and a unit for combining the red, green, and blue fluxes modulated by the liquid crystal panel, a color image combined by the unit being magnified and projected on the screen through a projector lens.

Recently, a projector with a narrow-band RGB light source in which RGB fluxes are spatially modulated by a grating light valve (GLV) in place of a liquid crystal panel has been developed.

Screens that display images from these projectors typically include light diffusion layers that scatter light onto the screens to achieve an excellent viewed image. The light diffusion layers have uniform diffusion properties over the screens and a luminance distribution of bilateral symmetry with the maximum at a scattering angle of 0° for light at an incident angle of 0°, as shown in FIG. 4. Diffusion properties of the diffusion layers are usually represented by the angle of the full width half maximum (FWHM) or the half width half maximum (HWHM) of the maximum luminance, as shown in FIG. 4.

When screen gain is increased, such uniform diffusion properties over the screen cause a large difference in luminance between the center and the periphery of the screen with a bright image in the center and a dark image at the periphery. This is because projected light has an incident angle larger than 0° at the periphery, and is largely reflected away from the viewer.

To overcome such luminance difference on the screen, Japanese Unexamined Patent Application Publication No. 10-142699 discloses a screen that includes a reflective layer having gradually increasing surface roughness from the center to the periphery. The diffusibility of light reflected from the screen gradually increases from the center to the periphery.

Furthermore, Japanese Unexamined Patent Application Publication No. 2000-162710 discloses a screen that includes a group of mirrors coupled orthogonally with each other and achieves a uniform luminance distribution by adjustment of the tilt angle of each coupled mirror.

Although the screen that includes the reflective layer with controlled surface roughness has an improved luminance distribution, a reflected-light component having the highest luminance at the periphery of the screen is still directed away from the viewer and many reflected-light components do not contribute to the viewed image. Thus this screen uses projected light inefficiently and it is difficult to improve the overall luminance of the screen.

On the other hand, the screen that includes the coupled mirrors can have a horizontally uniform luminance distribution, but cannot have a vertically uniform luminance distribution because of its structure.

SUMMARY OF THE INVENTION

Accordingly, to overcome the problems described above, the present invention provides a screen that has a simple structure, utilizes projected light efficiently, and has an improved luminance uniformity between the center and the periphery of the screen.

In a first aspect of the present invention, a screen that displays a projected light image has a layer for reflecting the light image, a diffusion layer for scattering the light reflected from the reflective layer, and a Fresnel lens between these two layers. This allows most of the light image at the periphery of the screen to be reflected to the viewer, thereby enabling an increase in screen gain and a uniform luminance distribution over the screen.

The diffusion layer may have elliptic diffusion properties, in which the longitudinal diffusion angle is different from the transverse diffusion angle. The FWHM longitudinal diffusion angle may be 10°–50°, and the FWHM transverse diffusion angle may be 60°–180°. In these screens, the directivity and the screen gain can be increased by reducing the longitudinal diffusion area, which requires a narrow viewable area. In addition, the viewed image can be improved by increasing the transverse diffusion area. Furthermore, the reduction in the longitudinal diffusion area results in less influence of incident light from above, and thus achieves higher contrast under strong illumination.

The diffusion layer may have circular diffusion properties of the same FWHM diffusion angle of 30°–60° in both the longitudinal direction and the transverse direction. While a common diffusion layer with the circular diffusion properties may be used to secure a required viewing angle, the screen gain, contrast, and uniformity of luminance can be increased by the effect of the Fresnel lens.

The Fresnel lens and the reflective layer may be attached to each other with an adhesive that has a lower refractive index than the Fresnel lens. Surface asperities of the Fresnel lens may be coated with a resin that has a lower refractive index than the adhesive. A larger difference in the refractive index between the Fresnel lens and the adhesive or the resin causes a larger refraction at the boundary between them, and thereby a sufficient effect of the Fresnel lens can be achieved.

The reflective layer may include an aluminum layer. Incident light to the aluminum layer is reflected at a high reflectance. The aluminum layer may be formed on a base film by, for example, evaporation. The aluminum layer, when attached to the Fresnel lens, reflects light passing through the diffusion layer. When a selective absorption layer that has a high transmittance for light in a specific wavelength region and highly absorbs the other light in a visible wavelength region is disposed on the aluminum layer, the aluminum layer selectively reflects light in the specific wavelength region among the light passing through the diffusion layer. This allows most of outside light that passes through the diffusion layer to be absorbed, achieving further improvement in the contrast under strong illumination. The selective absorption layer may be prepared by the combination of a resin binder and a selective absorption dye that absorbs light in a predetermined wavelength region and is transparent to light in the other wavelength region.

The reflective layer may include an optical film that highly reflects light in a specific wavelength region corresponding to the light image and highly absorbs light in a visible wavelength region other than the specific wavelength region. The optical film may include metal and dielectric films alternately laminated. The metal film may be composed of niobium, aluminum, or silver. The dielectric film may be composed of niobium oxide, titanium oxide, tantalum oxide, aluminum oxide, or silicon oxide. The reflective layer selectively reflects light in the specific wavelength region among the light passing through the diffusion layer. This allows most of outside light that passes through the diffusion layer to be absorbed, achieving further improvement in the contrast under strong illumination. The laminate of alternating metal and dielectric films may be deposited on a base film by, for example, sputtering.

The reflective layer may include an optical film and an absorption layer. The optical film highly reflects light in a specific wavelength region corresponding to the light image and has a high transmittance for light in a visible wavelength region other than the specific wavelength region. The absorption layer absorbs light that passes through the optical film. The optical film may include high-refractive-index and low-refractive-index layers alternately laminated. The high-refractive-index layer may be composed of niobium oxide, tantalum oxide, or titanium oxide. The low-refractive-index layer may be composed of silicon oxide or magnesium fluoride. The reflective layer selectively reflects the light in the specific wavelength region among the light passing through the diffusion layer. This allows most of outside light that passes through the diffusion layer to be absorbed, achieving further improvement in the contrast under strong illumination. The laminate of alternating high-refractive-index and low-refractive-index layers may be deposited on a base film by, for example, sputtering.

The Fresnel lens and the diffusion layer may be attached to each other with an adhesive. Even a laminate of a commercially available Fresnel lens and a commercially available diffusion film can easily provide a screen with highly uniform luminance.

In a second aspect of the present invention, a screen that displays a projected light image has a layer for reflecting the light image, a diffusion layer for scattering the light reflected from the reflective layer, and a linear Fresnel lens interposed between the reflective layer and the diffusion layer and has longitudinal converging properties. The light image at the periphery of the upper part and the lower part of the screen can mainly be reflected to the viewer, thereby enabling an increase in screen gain and a uniform luminance distribution over the screen.

The diffusion layer may have elliptic diffusion properties, in which the longitudinal diffusion angle is different from the transverse diffusion angle. The FWHM longitudinal diffusion angle may be 10°–50°, and the FWHM transverse diffusion angle may be 60°–180°. The directivity and the screen gain can be increased by adjusting the converging properties of the linear Fresnel lens to a longitudinally narrow viewable area and reducing the longitudinal diffusion area. In addition, the viewed image can be improved by increasing the transverse diffusion area. Furthermore, the reduction in the longitudinal diffusion area results in less influence of incident light from above, and thus achieves higher contrast under strong illumination.

The diffusion layer may have circular diffusion properties of the same FWHM diffusion angle of 30°–60° in both the longitudinal direction and the transverse direction. While a common diffusion layer with the circular diffusion properties may be used to secure a required viewing angle, the screen gain, contrast, and uniformity of luminance can be increased owing to the converging properties of the linear Fresnel lens.

The linear Fresnel lens and the reflective layer may be attached to each other with an adhesive that has a lower refractive index than the linear Fresnel lens. Surface asperities of the linear Fresnel lens may be coated with a resin that has a lower refractive index than the adhesive. A larger difference in the refractive index between the linear Fresnel lens and the adhesive or the resin causes a larger refraction at the boundary between them, and thereby a sufficient effect of the linear Fresnel lens can be achieved.

The reflective layer may include an aluminum layer. Incident light to the aluminum layer is reflected at a high reflectance. The aluminum layer may be formed on a base film by, for example, evaporation. The aluminum layer, when attached to the linear Fresnel lens, reflects the light passing through the diffusion layer. When a selective absorption layer that has a high transmittance for light in a specific wavelength region and highly absorbs the other light in a visible wavelength region is disposed on the aluminum layer, the aluminum layer selectively reflects light in the specific wavelength region among the light passing through the diffusion layer. This allows most of outside light that passes through the diffusion layer to be absorbed, achieving further improvement in the contrast under strong illumination. The selective absorption layer may be prepared by the combination of a resin binder and a selective absorption dye that absorbs light in a predetermined wavelength region and is transparent to the light in the other wavelength region.

The reflective layer may include an optical film that highly reflects light in a specific wavelength region corresponding to the light image and highly absorbs light in a visible wavelength region other than the specific wavelength region. The optical film may include metal and dielectric films alternately laminated. The metal film may be composed of niobium, aluminum, or silver. The dielectric film may be composed of niobium oxide, titanium oxide, tantalum oxide, aluminum oxide, or silicon oxide. The reflective layer selectively reflects the light in the specific wavelength region among the light passing through the diffusion layer. This allows most of outside light that passes through the diffusion layer to be absorbed, achieving further improvement in the contrast under strong illumination. The laminate of alternating metal and dielectric films may be deposited on a base film by, for example, sputtering.

The reflective layer may include an optical film and an absorption layer. The optical film highly reflects light in a specific wavelength region corresponding to the light image and has a high transmittance for light in a visible wavelength region other than the specific wavelength region. The absorption layer absorbs light that passes through the optical film. The optical film may include high-refractive-index and low-refractive-index layers alternately laminated. The high-refractive-index layer may be composed of niobium oxide, tantalum oxide, or titanium oxide. The low-refractive-index layer may be composed of silicon oxide or magnesium fluoride. The reflective layer selectively reflects the light in the specific wavelength region among the light passing through the diffusion layer. This allows most of outside light that passes through the diffusion layer to be absorbed, achieving further improvement in the contrast under strong illumination. The laminate of alternating high-refractiveindex and low-refractive-index layers may be deposited on a base film by, for example, sputtering.

The linear Fresnel lens and the diffusion layer may be attached to each other with an adhesive. Even a laminate of a commercially available linear Fresnel lens and a commercially available diffusion film can easily provide a screen with highly uniform luminance.

The present invention will be better understood from the following detailed description of the preferred embodiments of the invention with reference to the drawings.

DESCRIPTION OF THE PREFERRED EMBODIMENTS

Figure 1:
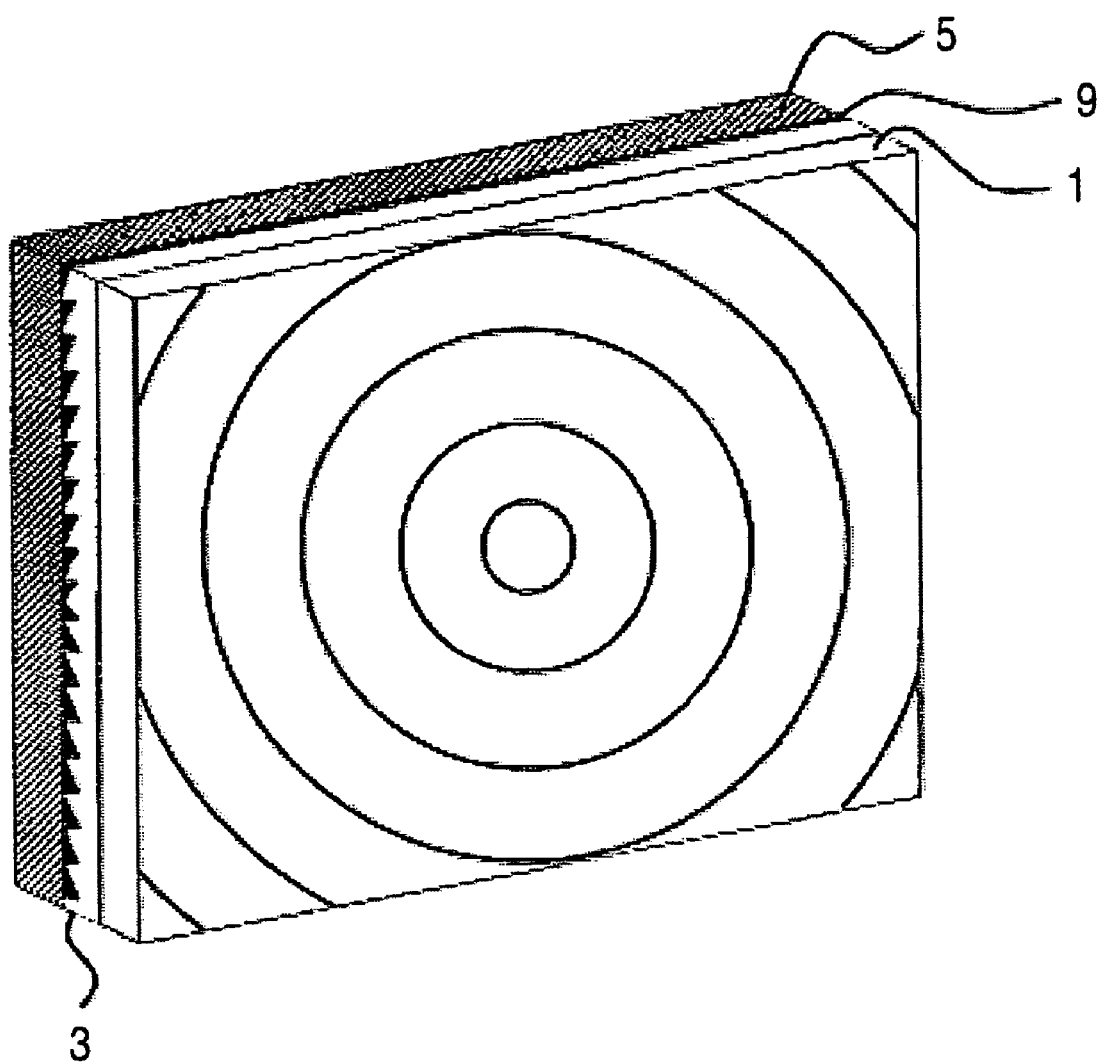
FIG. 1 is a perspective view of a screen according to a first embodiment of the present invention.

FIG. 1 shows a screen according to a first embodiment of the present invention. A diffusion film 1, a Fresnel lens 3, and a reflective layer 5 are laminated from front to back.

Figure 2:
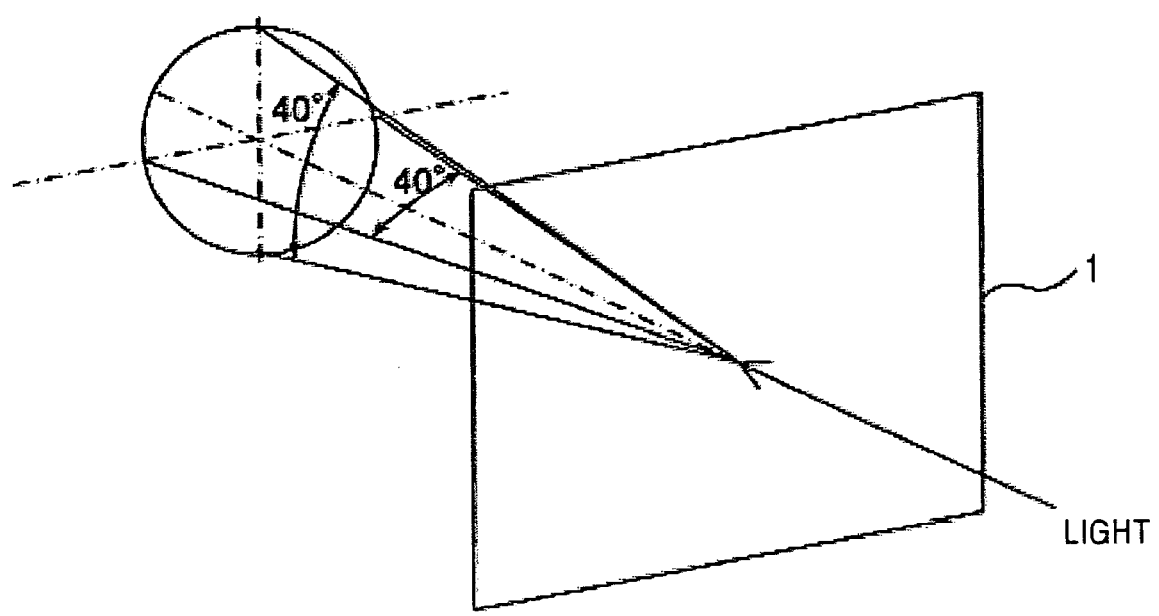
FIG. 2 is a schematic diagram showing circular diffusion properties of a diffusion film having an FWHM of 40°×40°.
Figure 3:
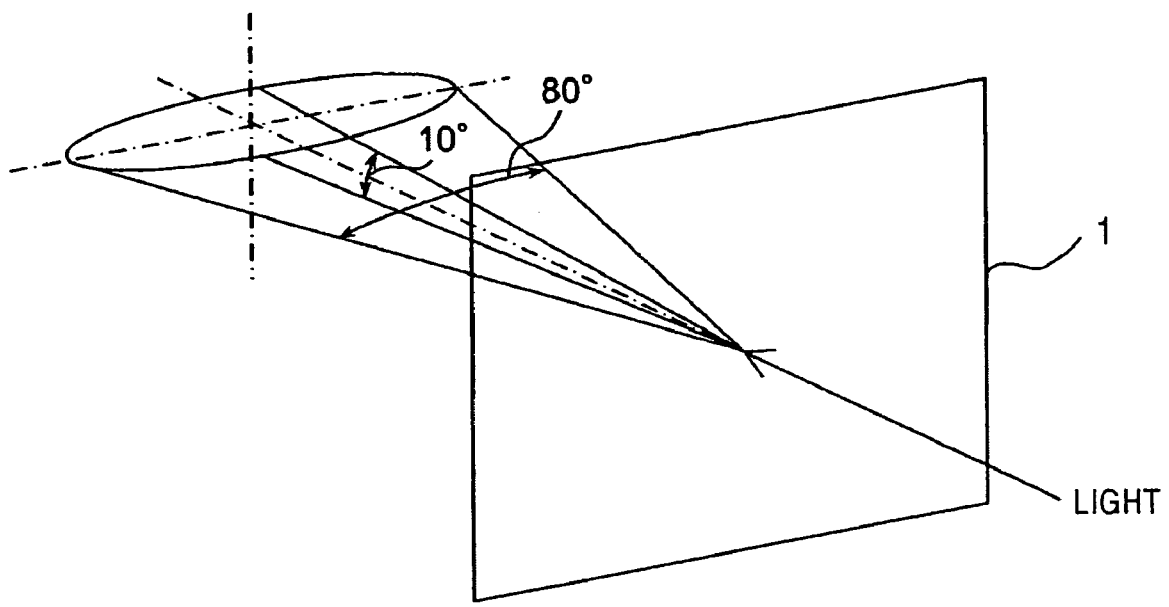
FIG. 3 is a schematic diagram showing elliptic diffusion properties of a diffusion film having an FWHM of 80°×10°.
Figure 4:
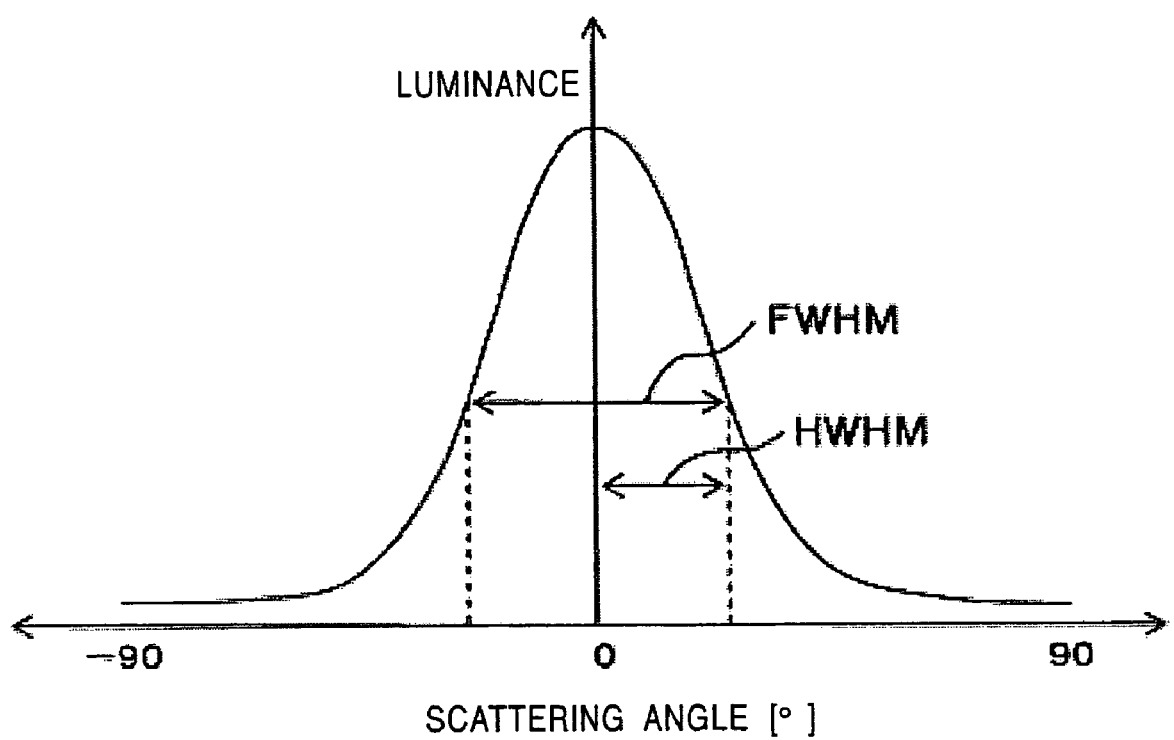
FIG. 4 is a graph showing diffusion properties.

The diffusion film 1 is disposed at the front surface of the screen and scatters light reflected from the reflective layer 5 over a certain area. Examples of the diffusion film 1 include a diffusion film having a circular diffusion pattern with the same diffusion angle in the transverse direction and the longitudinal direction, as shown in FIG. 2, and a diffusion film having an elliptic diffusion pattern in which the longitudinal diffusion angle is smaller than the transverse diffusion angle, as shown in FIG. 3. For the diffusion film having a circular diffusion pattern, the FWHM in FIG. 4 is preferably 30°–60°, depending on the viewing angle required for the screen. FWHMs larger than 60° will increase ineffective diffusion outside the viewable area in the longitudinal direction and result in reduced screen gain. FIG. 2 shows a diffusion film that has an FWHM of 40°×40°. On the other hand, for the diffusion film having an elliptic diffusion pattern, preferably, the FWHM is 60°–180° in the transverse direction to achieve a wide viewing angle, and is 10°–50° in the longitudinal direction to increase the screen gain in a narrow viewable area. FIG. 3 shows a diffusion film that has an FWHM of 80°×10°.

Figure 5:
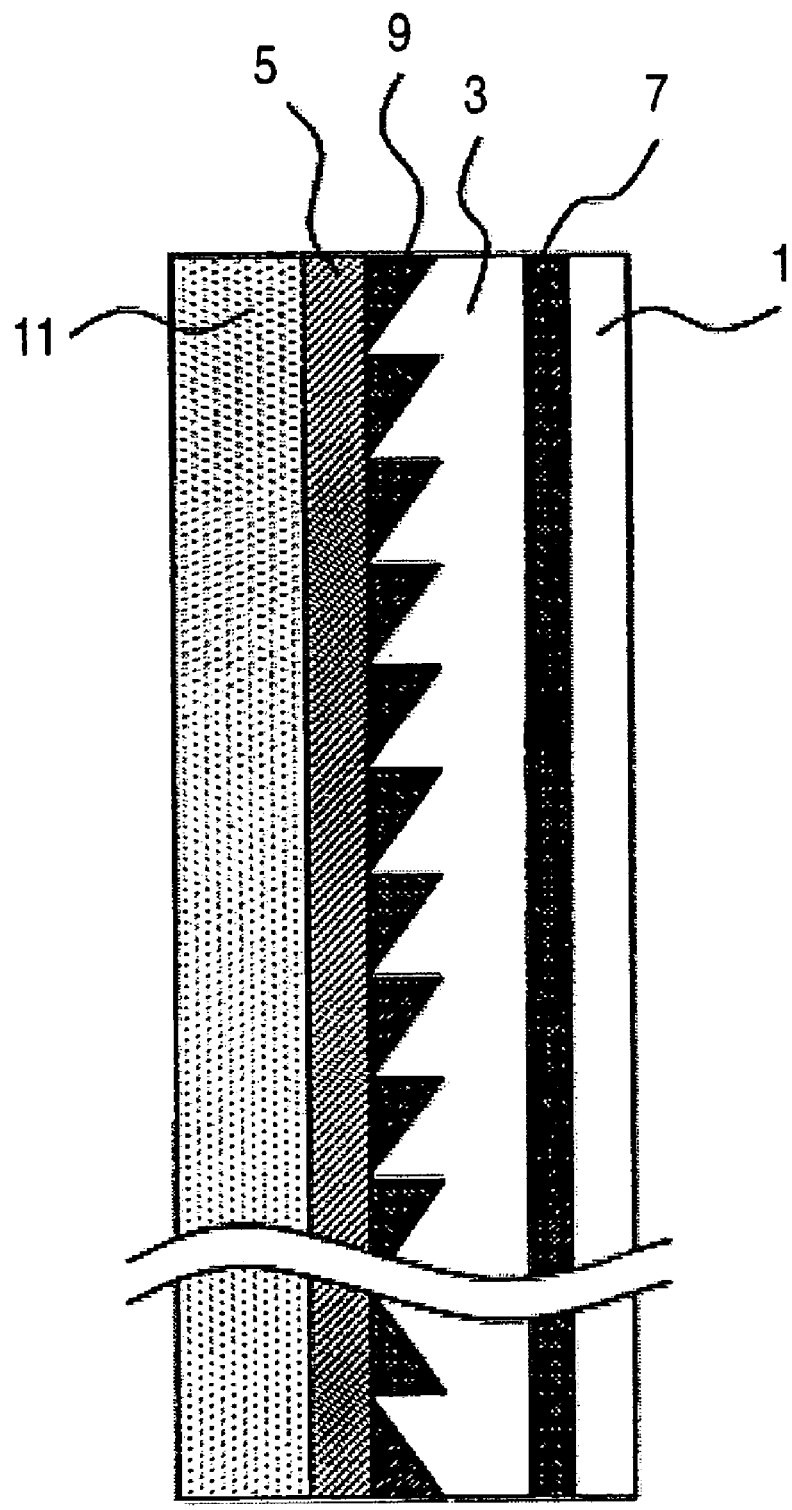
FIG. 5 is a cross-sectional view of a laminate structure of a screen according to the present invention.

The Fresnel lens 3 is interposed between the reflective layer 5 and the diffusion film 1, and directs the reflection of projected light to the viewable area. The Fresnel lens 3 is attached to the diffusion film 1 and the reflective layer 5 with transparent adhesives. FIG. 5 shows a laminate that includes adhesives 7 and 9 and the reflective layer 5 disposed on a base film 11.

Figure 6:
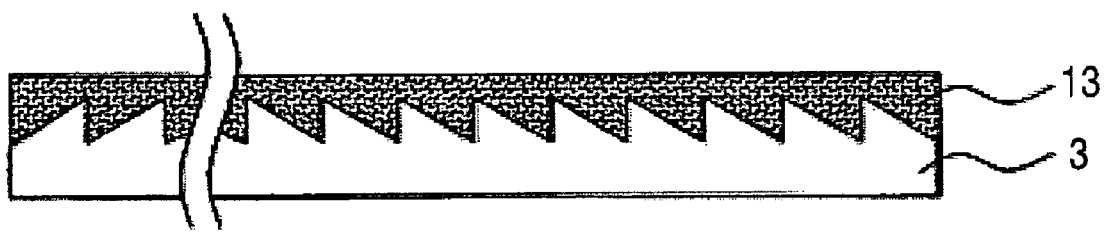
FIG. 6 is a cross-sectional view of a Fresnel lens (or a linear Fresnel lens) with the surface asperities being coated with a low-refractive-index resin.

Preferably, the adhesive that is used to attach the reflective layer 5 to the Fresnel lens 3 has a refractive index lower than that of the Fresnel lens 3 and as low as possible. When the difference in the refractive index between the adhesive and the Fresnel lens 3 is small, the angle of refraction is small at the boundary and full use cannot be made of the effect of the Fresnel lens. However, refractive indexes of typical adhesives are about 1.45 at minimum. Thus, as shown in FIG. 6, surface asperities of the Fresnel lens 3 may be coated with a low-refractive-index resin 13 that has a lower refractive index than the adhesive 9, and the coated Fresnel lens may be attached to the reflective layer 5 with the adhesive 9, as shown in FIG. 7.

Figure 7:
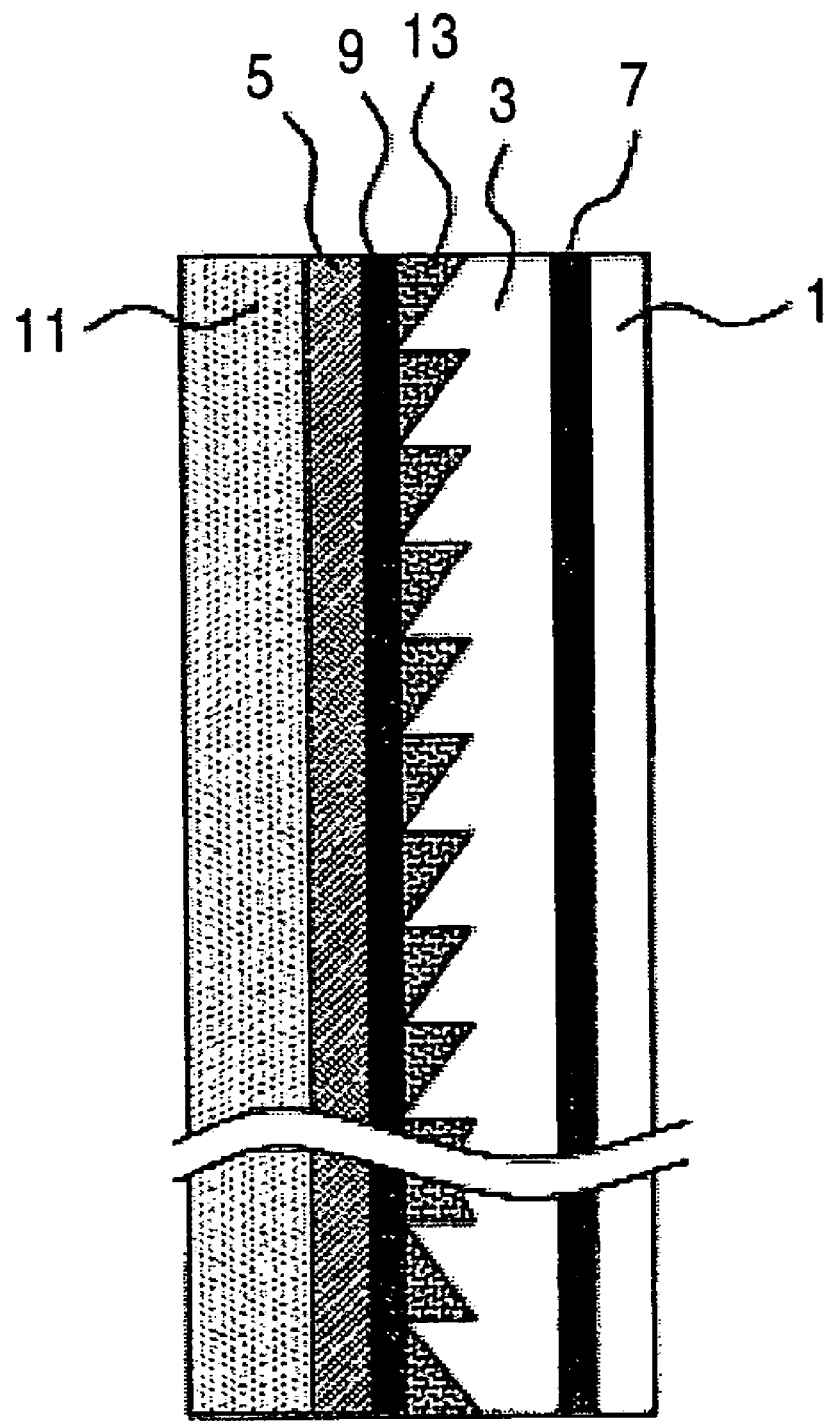
FIG. 7 is a cross-sectional view of another laminate structure of a screen according to the present invention.
Figure 8:
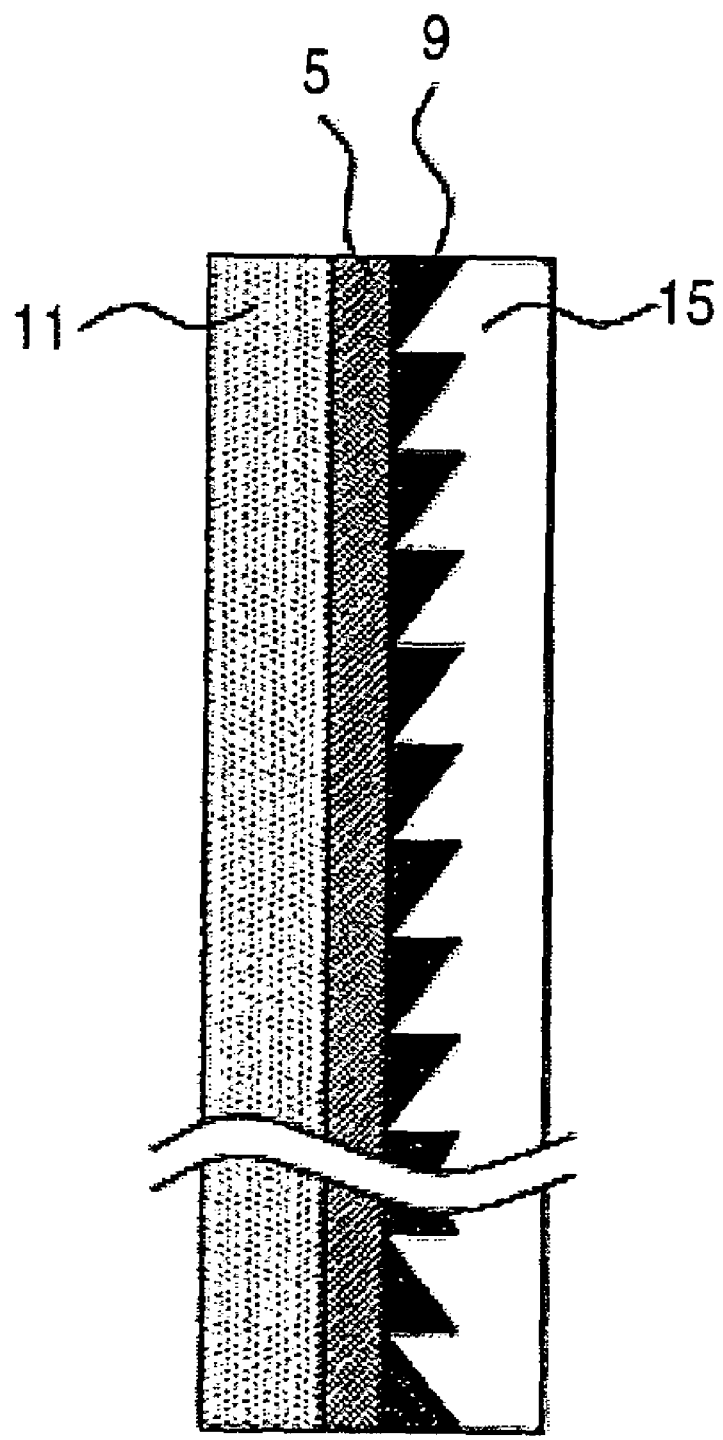
FIG. 8 is a cross-sectional view of a laminate structure of a screen that includes a combination of a Fresnel lens and a diffusion film according to the present invention.
Figure 9:
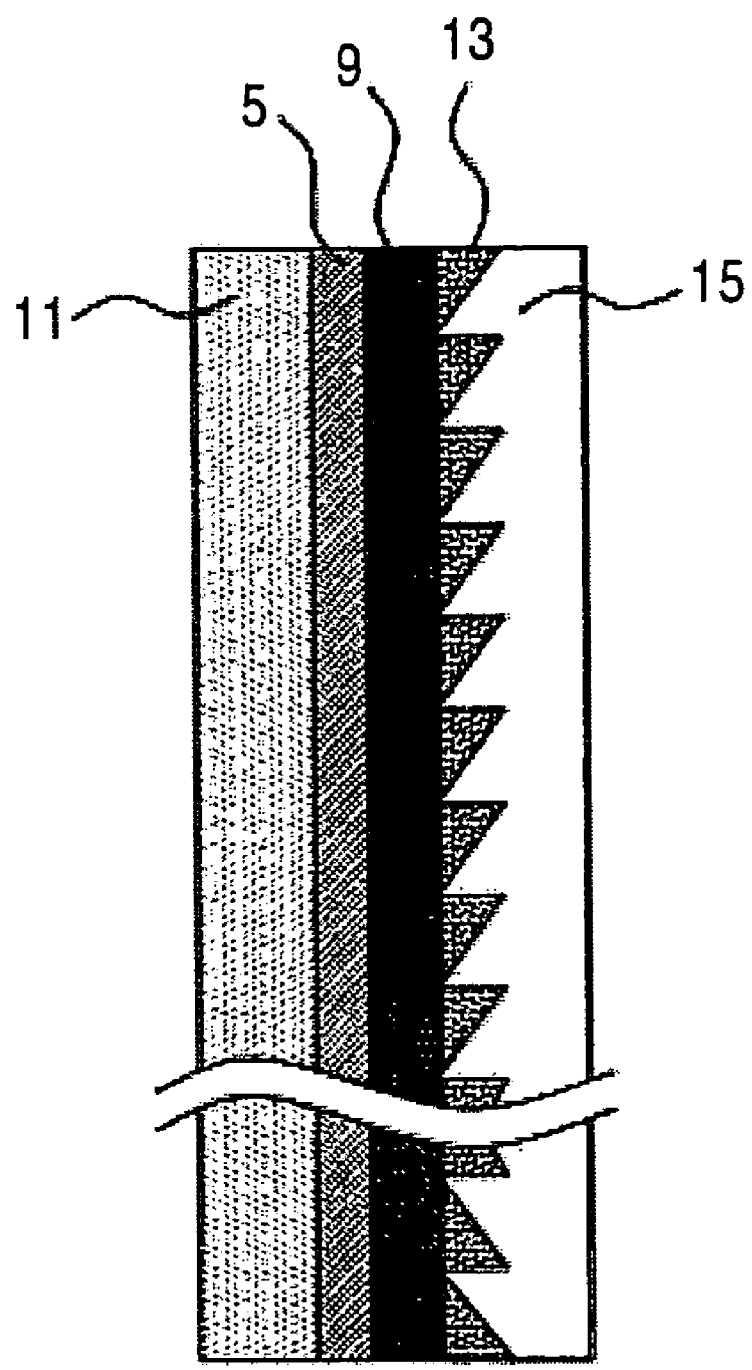
FIG. 9 is a cross-sectional view of another laminate structure of a screen that includes a combination of a Fresnel lens and a diffusion film according to the present invention.

The Fresnel lens 3 and the diffusion film 1 in FIG. 5 or 7 may be molded in one piece. FIG. 8 and FIG. 9 each shows a structure that includes an integrally-molded diffusion film 15, in which a Fresnel lens is disposed on the back side of a diffusion film.

Figure 10:
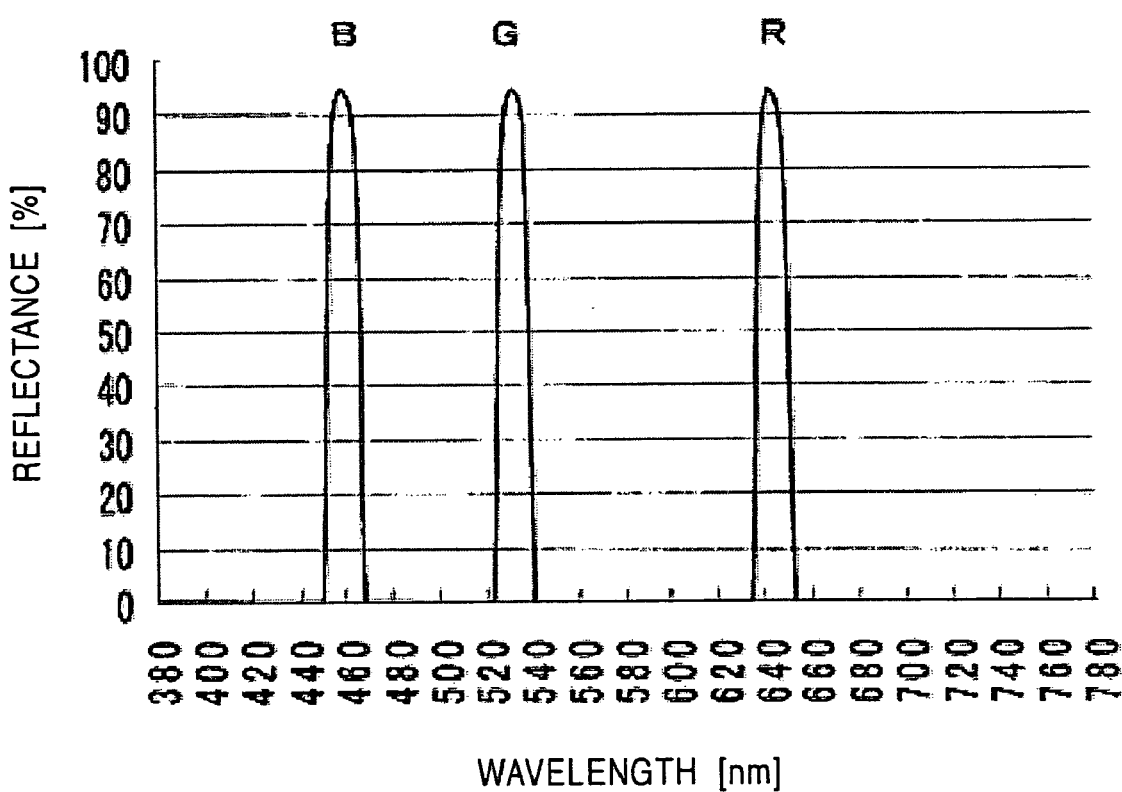
FIG. 10 is a spectrum showing selective reflectance properties of a reflective layer in a screen according to the present invention.

The reflective layer 5, which reflects the projected light, may be formed on the base film 11 by evaporation or coating using a metallic material having high reflectance, such as aluminum, or a light-reflecting material, such as a light-reflecting pigment. The reflective layer 5 may have selective reflectance properties and mainly reflect the light in the wavelength region of the projected light, as shown in FIG. 10. This further reduces the influence of outside light and improves the contrast of the screen.

Examples of the reflective layer 5 that has such selective reflectance properties include an optical film that has wavelength-dependent reflection/transmission properties (Japanese Patent Application No. 2002-070572, etc.), an optical film that has wavelength-dependent reflection/absorption properties (Japanese Patent Application No. 2002-259027), or an optical film that has wavelength-dependent absorption/transmission properties (Japanese Patent Application No. 2002-331993).

The optical film that has wavelength-dependent reflection/transmission (Japanese Patent Application No. 2002-070572, etc.) has a high reflectance for light in a specific wavelength region, and has a high transmittance for light in the other visible wavelength region. This optical film may be prepared by alternately laminating high-refractive-index layers and low-refractive-index layers on the base film 11 by deposition, such as evaporation or sputtering, or coating. In the deposition, such as evaporation or sputtering, a material having a high refractive index, such as $Nb_2O_5$, $TiO_2$, or $Ta_2O_5$, may be used for the high-refractive-index layer, and a material having a low refractive index, such as $SiO_2$ or $MgF_2$, may be used for the low-refractive-index layer. In the coating, a thermosetting resin that has different refractive index may be used. When the multilayer optical film is used as the reflective layer 5, the base film 11 is coated with a black coating at the backside, or is a black film, to absorb transmitted light from the multilayer optical film. In this manner, the reflective layer 5 that reflects the projected light and absorbs light in the other wavelength region is prepared.

The optical film that has wavelength-dependent reflection/absorption properties (Japanese Patent Application No. 2002-259027) has a high reflectance for light in a specific wavelength region, and has a high absorptance for light in the other visible wavelength region. This optical film may be prepared by alternately laminating metal films, such as Al, Nb, or Ag, and dielectric films, such as $Nb_2O_5$, $TiO_2$, $Ta_2O_5$, $Al_2O_3$, or $SiO_2$, on the base film 11 by sputtering. In this manner, the reflective layer 5 that reflects the projected light and absorbs light in the other wavelength region is prepared.

The optical film that has wavelength-dependent absorption/transmission properties (Japanese Patent Application No. 2002-331993) has a high transmittance for light in a specific wavelength region, and has a high absorptance for light in the other visible wavelength region. This optical film may be prepared by the combination of a resin binder and a selective absorption dye that absorbs light in a predetermined wavelength region and is transparent to light in the other wavelength region. The reflective layer 5 that reflects the projected light and absorbs light in the other wavelength region is prepared by attaching the optical film to a reflective layer, such as aluminum, on the base film 11.

The base film 11 on which the reflective layer 5 is disposed may be composed of a polymer material, such as polyethylene terephthalate (PET), polyethylene naphthalate (PEN), polyethersulfone (PES), polyolefin (PO), or polycarbonate (PC).

Figure 11:
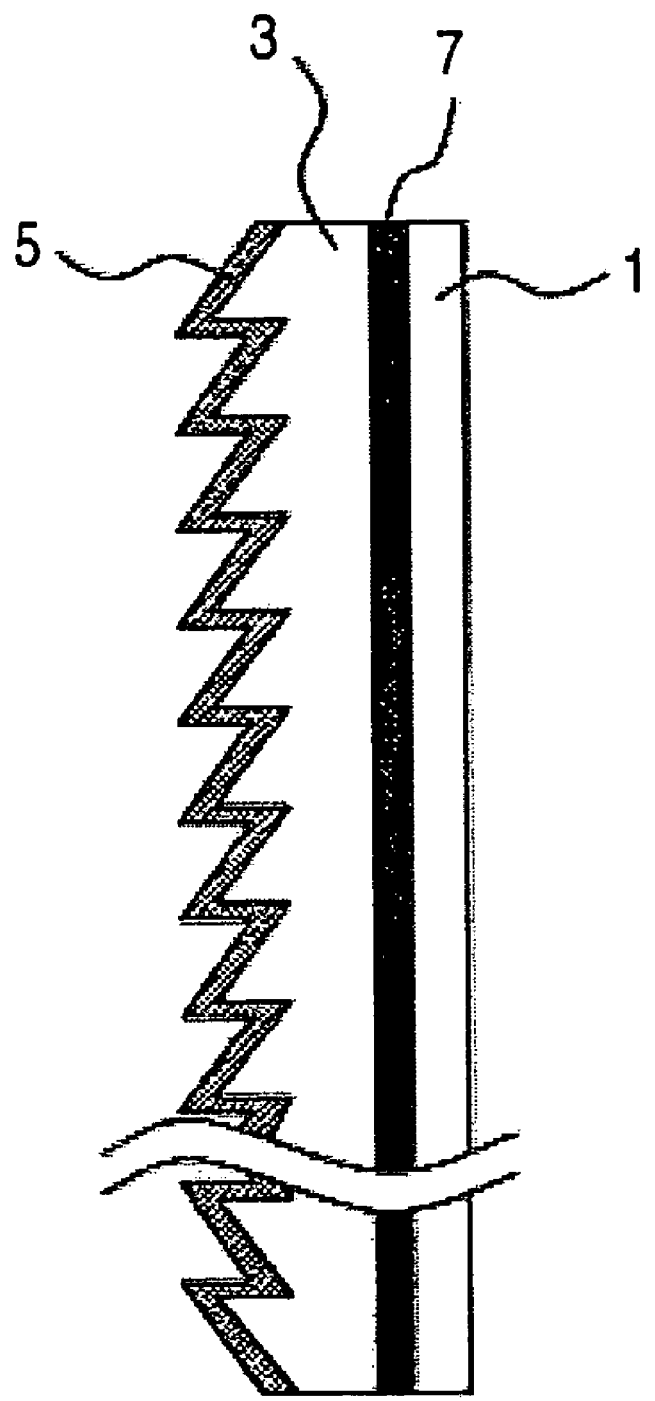
FIG. 11 is a cross-sectional view of still another laminate structure of a screen according to the present invention.

The reflective layer 5 may be formed on the base film 11 and then attached to the Fresnel lens 3, or may be deposited on the Fresnel lens 3 by evaporation, sputtering, or coating, as shown in FIG. 11.

As shown in FIG. 5, a screen of a laminated structure according to the present invention may be prepared as follows: A diffusion film 1 and a Fresnel lens 3 both of which are composed of a polyester having a refractive index of 1.65 are attached to each other with an optical adhesive 7 having a refractive index of 1.47 (manufactured by Tomoegawa Paper Co. Ltd.), and the Fresnel lens 3 is attached to a reflective layer 5 disposed on a base film 11 with an optical adhesive 9 having a refractive index of 1.47 (manufactured by Tomoegawa Paper Co. Ltd.).

For an example shown in FIG. 7, surface asperities of a Fresnel lens 3 that is composed of a polyester having a refractive index of 1.65 is coated with a low-refractive-index resin 13 having a refractive index of 1.38 (manufactured by Sony Chemicals Co.). Then, this surface of the Fresnel lens 3 is attached to a reflective layer 5 with an optical adhesive 9 having a refractive index of 1.47 (manufactured by Tomoegawa Paper Co. Ltd.), and the opposite surface is attached to a diffusion film 1 that is composed of a polyester having a refractive index of 1.65 with an optical adhesive 7 having a refractive index of 1.47 (manufactured by Tomoegawa Paper Co. Ltd.).

The operation of a screen according to the present invention is described below with reference to FIGS. 12 and 13. FIG. 13 is an enlarged cross-sectional view of portion A in FIG. 12; the screen has the laminate structure shown in FIG. 7.

When light Lp is projected from a projector P on a screen S, the light Lp passes through a diffusion film 1, is diffused at a predetermined scattering angle into the Fresnel lens 3, is refracted at a boundary between the Fresnel lens 3 and surface asperities, the boundary being in contact with a low-refractive-index resin layer 13, is reflected from a reflective layer 5, is refracted again at the boundary between the Fresnel lens 3 and the surface asperities, is diffused by the diffusion film 1, and is emitted from the screen toward a viewer W at a predetermined scattering angular distribution B.

Since the light Lp projected on the screen S is reflected such that axial light of the scattering angular distribution B falls within a viewable area over the screen owing to the effect of the Fresnel lens 3, the viewer W can see an image of uniform luminance over the screen. In this case, although a smaller diffusion angle of the diffusion film 1 exhibits larger luminance and higher screen gain at the center of the scattering angular distribution B, a smaller transverse diffusion angle results in a narrower viewing angle and a poorer viewed image.

Thus, when the diffusion film 1 has circular diffusion properties, the FWHM diffusion angle should be 30°–60°. An FWHM less than 30° results in a small viewing angle and a poor viewed image, and an FWHM larger than 60° results in a low screen gain. Thus, the Fresnel lens 3 has little effect on the uniform luminance. On the other hand, when the diffusion film 1 has elliptic diffusion properties, the FWHM in the transverse direction should be 60°–180°, and that in the longitudinal direction should be 10°–50°. Such a wide transverse diffusion angle and a narrow longitudinal diffusion angle result in a wide viewing angle and high uniform luminance owing to the effect of the Fresnel lens 3. In addition, when the longitudinal diffusion angle is small, illuminating light incident from above is largely reflected downward without passing through the diffusion film 1, and thereby a high contrast screen that is little influenced by outside light can be provided.

When the reflective layer 5 has selective reflectance properties, the influence of outside light that passes through the diffusion film 1 is also reduced, and thus the contrast under strong illumination is further improved. Furthermore, since a screen according to the present invention has a structure of laminated films, a high-performance rollup screen can be provided.

Figure 14:
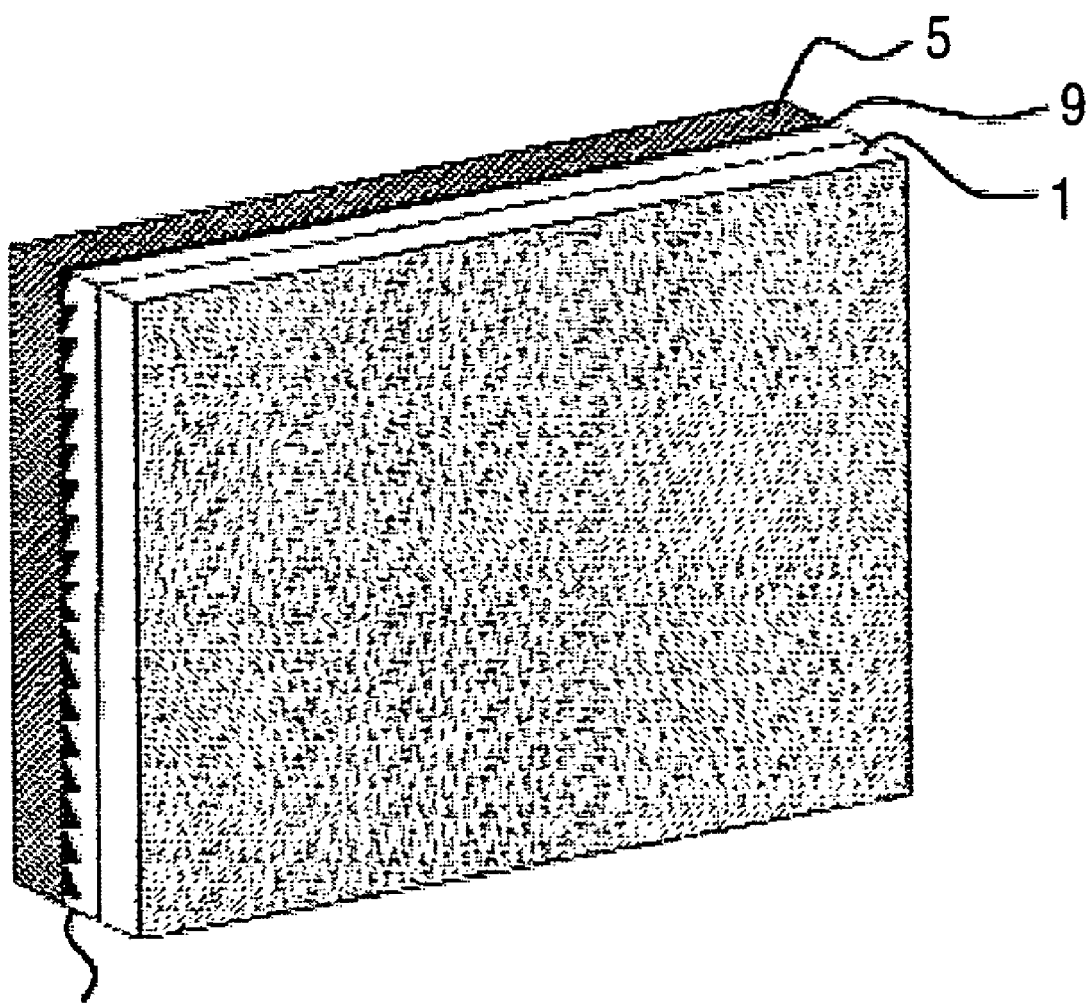
FIG. 14 is a perspective view of a screen according to a second embodiment of the present invention.

FIG. 14 shows a screen according to a second embodiment of the present invention. The components of this screen are the same as those of the first embodiment except that a linear Fresnel lens 23 that converges light only in the longitudinal direction (vertical direction) is used in place of the Fresnel lens 3. Thus, a repeated description shall be omitted.

Figure 12:
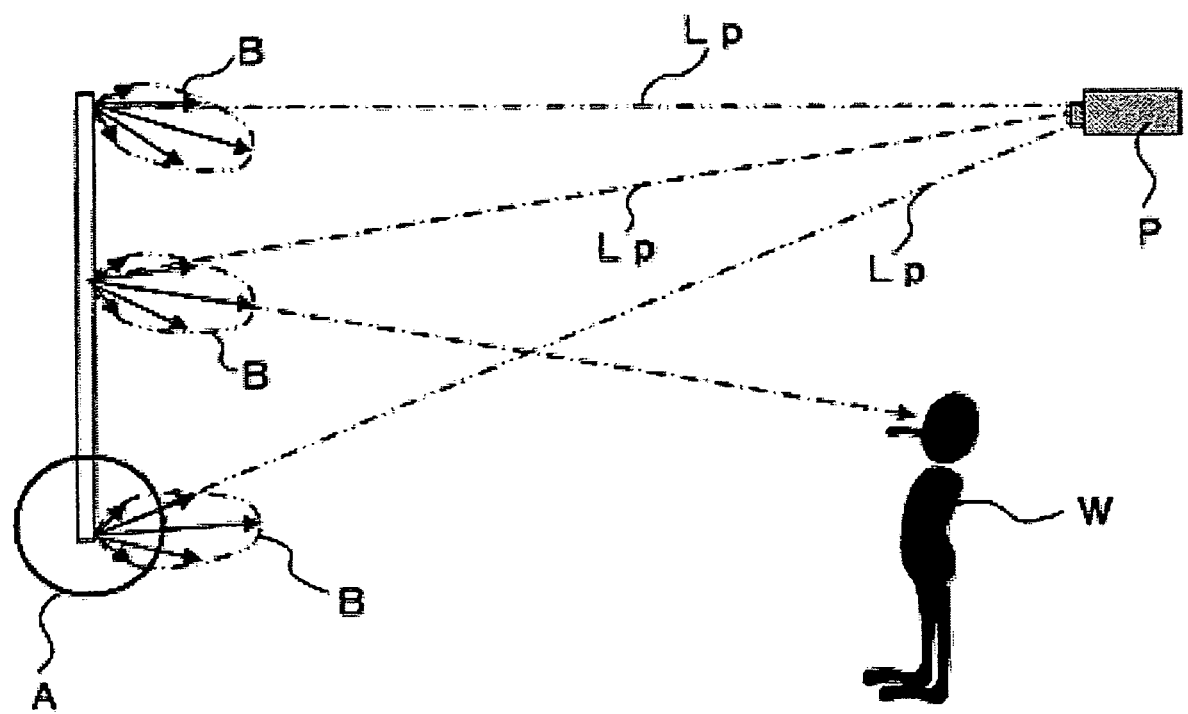
FIG. 12 is a schematic diagram showing the operation of a screen according to the present invention.
Figure 13:
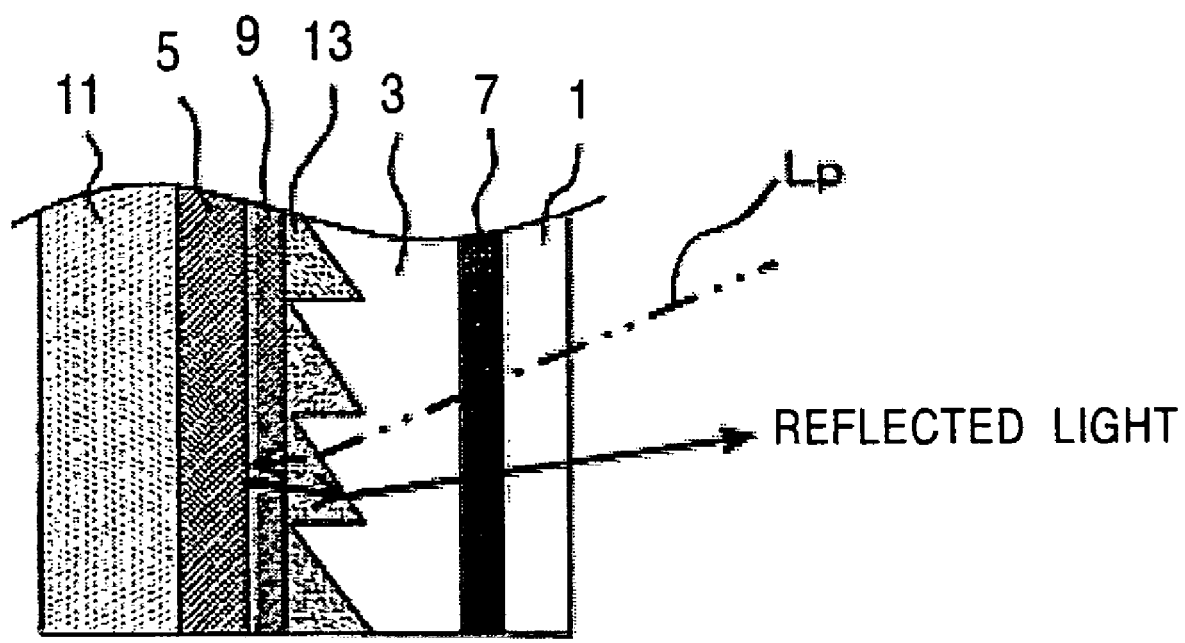
FIG. 13 is a cross-sectional view showing the propagation of light in a screen according to the present invention.

The screen according to the second embodiment has the same effect, as shown in FIGS. 12 and 13, only in the longitudinal direction owing to the refraction in the longitudinal direction by the linear Fresnel lens 23. Thus, the reflection of projected light is efficiently converged to the longitudinal viewable area without taking the transverse viewable area into consideration.

While only the linear Fresnel lens in the longitudinal direction is used in the second embodiment, a linear cross Fresnel lens, in which a linear Fresnel lens in the longitudinal direction and that in the transverse direction are attached to each other, may be used. In the linear cross Fresnel lens, since the magnification can be changed independently in the longitudinal direction and in the transverse direction, the reflected light can be efficiently converged to the longitudinal viewable area and the transverse viewable area. Thus, a high-performance, wide and large screen with uniform luminance can also be provided.

What is claimed is:

1. A screen for displaying a projected light image, comprising:
   a reflective layer for reflecting the light image;
   a diffusion layer for scattering the light from the reflective layer; and
   a Fresnel lens interposed between the reflective layer and the diffusion layer,
   wherein the diffusion layer has elliptic diffusion properties, in which a diffusion angle in the longitudinal direction and in the transverse direction are different, and
   wherein the diffusion layer has an FWHM longitudinal diffusion angle of 10°–50° and an FWHM transverse diffusion angle of 60°–180°.

2. The screen according to claim 1, wherein the reflective layer comprises an aluminum layer.

3. The screen according to claim 1, wherein the reflective layer comprises an optical film that highly reflects light in a specific wavelength region corresponding to the light image and highly absorbs light in a visible wavelength region other than the specific wavelength region.

4. The screen according to claim 3, wherein the optical film comprises metal and dielectric films alternately laminated.

5. The screen according to claim 4, wherein the metal film comprises one selected from the group consisting of niobium, aluminum, and silver, and the dielectric film comprises one selected from the group consisting of niobium oxide, titanium oxide, tantalum oxide, aluminum oxide, and silicon oxide.

6. The screen according to claim 1, wherein the reflective layer comprises an optical film that highly reflects light in a specific wavelength region corresponding to the light image and has a high transmittance for light in a visible wavelength region other than the specific wavelength region, and an absorption layer that absorbs light that passes through the optical film.

7. The screen according to claim 6, wherein the optical film comprises high-refractive-index and low-refractive-index layers alternately laminated.

8. The screen according to claim 7, wherein the high-refractive-index layer comprises one selected from the group consisting of niobium oxide, tantalum oxide, and titanium oxide, and the low-refractive-index layer comprises one selected from the group consisting of silicon oxide and magnesium fluoride.

9. The screen according to claim 1, wherein the Fresnel lens and the diffusion layer are attached to each other with an adhesive.

10. A screen for displaying a projected light image, comprising:
    a reflective layer for reflecting the light image;
    a diffusion layer for scattering the light from the reflective layer; and
    a Fresnel lens interposed between the reflective layer and the diffusion layer,
    wherein the diffusion layer has circular diffusion properties, in which a diffusion angle in the longitudinal direction and in the transverse direction are the same, the FWHM diffusion angle being 30°–60°.

11. A screen for displaying a projected light image, comprising:
    a reflective layer for reflecting the light image;
    a diffusion layer for scattering the light from the reflective layer; and
    a Fresnel lens interposed between the reflective layer and the diffusion layer,
    wherein the Fresnel lens and the reflective layer are attached to each other with an adhesive that has a lower refractive index than the Fresnel lens.

12. The screen according to claim 11, wherein surface asperities of the Fresnel lens are coated with a resin that has a lower refractive index than the adhesive.

13. A screen for displaying a projected light image, comprising:
    a reflective layer for reflecting the light image;
    a diffusion layer for scattering the light from the reflective layer; and
    a linear Fresnel lens interposed between the reflective layer and the diffusion layer, said linear Fresnel having longitudinal converging properties, wherein the diffusion layer has elliptic diffusion properties, in which a diffusion angle in the longitudinal direction and in the transverse direction are different, and
    wherein the diffusion layer has an FWHM longitudinal diffusion angle of 10°–50° and an FWHM transverse diffusion angle of 60°–180°.

14. The screen according to claim 13, wherein the reflective layer comprises an aluminum layer.

15. The screen according to claim 13, wherein the reflective layer comprises an optical film that highly reflects light in a specific wavelength region corresponding to the light image and highly absorbs light in a visible wavelength region other than the specific wavelength region.

16. The screen according to claim 15, wherein the optical film comprises metal and dielectric films alternately laminated.

17. The screen according to claim 16, wherein the metal film comprises niobium, aluminum, or silver, and the dielectric film comprises niobium oxide, titanium oxide, tantalum oxide, aluminum oxide, or silicon oxide.

18. The screen according to claim 13, wherein the reflective layer comprises an optical film that highly reflects light in a specific wavelength region corresponding to the light image and has a high transmittance for light in a visible wavelength region other than the specific wavelength region, and an absorption layer that absorbs light that passes through the optical film.

19. The screen according to claim 18, wherein the optical film comprises high-refractive-index and low-refractive-index layers alternately laminated.

20. The screen according to claim 19, wherein the high-refractive-index layer comprises one selected from the group consisting of niobium oxide, tantalum oxide, and titanium oxide, and the low-refractive-index layer comprises one selected from the group consisting of silicon oxide and magnesium fluoride.

21. The screen according to claim 13, wherein the linear Fresnel lens and the diffusion layer are attached to each other with an adhesive.

22. A screen for displaying a projected light image, comprising:
    a reflective layer for reflecting the light image;
    a diffusion layer for scattering the light from the reflective layer; and
    a linear Fresnel lens interposed between the reflective layer and the diffusion layer, said linear Fresnel having longitudinal converging properties,
    wherein the diffusion layer has circular diffusion properties, in which a diffusion angle in the longitudinal direction and in the transverse direction are the same, the FWHM diffusion angle being 30°–60°.

23. A screen for displaying a projected light image, comprising:
- a reflective layer for reflecting the light image;
- a diffusion layer for scattering the light from the reflective layer; and
- a linear Fresnel lens interposed between the reflective layer and the diffusion layer, said linear Fresnel having longitudinal converging properties, wherein the linear Fresnel lens and the reflective layer are attached to each other with an adhesive that has a lower refractive index than the linear Fresnel lens.

24. The screen according to claim 23, wherein surface asperities of the linear Fresnel lens are coated with a resin that has a lower refractive index than the adhesive.

* * * * *